(12) United States Patent
Rutjes et al.

(10) Patent No.: US 8,207,830 B2
(45) Date of Patent: Jun. 26, 2012

(54) NETWORK COMMUNICATION SYSTEM

(75) Inventors: Alwin Josephus Maria Rutjes,
Eindhoven (NL); Jos Van Meurs,
Eindhoven (NL)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 545 days.

(21) Appl. No.: 12/521,631

(22) PCT Filed: Jan. 3, 2008

(86) PCT No.: PCT/IB2008/050005
§ 371 (c)(1),
(2), (4) Date: Jun. 29, 2009

(87) PCT Pub. No.: WO2008/084414
PCT Pub. Date: Jul. 17, 2008

(65) Prior Publication Data
US 2010/0315261 A1    Dec. 16, 2010

(30) Foreign Application Priority Data
Jan. 4, 2007    (EP) .................................... 07100087

(51) Int. Cl.
G08C 19/16    (2006.01)
H02J 13/00    (2006.01)
G05B 23/02    (2006.01)
H04L 1/18    (2006.01)
H05B 37/00    (2006.01)
H01J 7/44    (2006.01)
(52) U.S. Cl. ...... 340/12.52; 340/9.1; 340/3.1; 340/3.52; 340/3.42; 340/3.43; 340/3.44; 714/749; 315/312; 315/318; 315/319; 315/51
(58) Field of Classification Search .................. 340/9.1, 340/12.52, 3.52, 3.1, 3.42–3.44, 3.5–3.54, 340/539.1, 540, 635; 714/749; 315/312, 315/318, 319, 51, 61, 149, 156
See application file for complete search history.

(56) References Cited

U.S. PATENT DOCUMENTS
5,898,384 A * 4/1999 Alt et al. .................... 340/8.1
(Continued)

OTHER PUBLICATIONS
"EmberZNet Application Developer's Guide"; Ember Corporation, Jun. 29, 2006, 85 Page Document, [Online], Retrieved From the Internet:    URL:http://www.telegisis.com/pdf/Zigbee/Ember/120-0066-000I_appDevGuide.pd>; retrieved on Apr. 18, 2008.

(Continued)

*Primary Examiner* — Benjamin C Lee
*Assistant Examiner* — Omeed Alizada
(74) *Attorney, Agent, or Firm* — Mark L. Beloborodov

(57) ABSTRACT

A network communication system (2) for two-way communication comprises: —at least one group of network devices (11); —at least one command device (20) capable of issuing at least one command signal (SC); 5—coordinating means (40) provided with a network definition memory (41) and with a device status memory (42). A network device, in response to receiving a command signal (SC), sends an acknowledgement signal (SA) to the command device. The coordinating means, in response to receiving a command signal for a 10 network device, watches for the corresponding acknowledgement signal from that network device and, in case of that network device failing to timely send the acknowledgement signal, amends in said device status memory (42) the status information (M(i)) relating to said network device. The coordinating means automatically removes a potentially defective 15 network device from the network definition memory (41) on entry of a network amendment mode.

12 Claims, 3 Drawing Sheets

U.S. PATENT DOCUMENTS

| | | | |
|---|---|---|---|
| 6,898,652 B2 | 5/2005 | Peters et al. | |
| 7,161,311 B2 * | 1/2007 | Mueller et al. | 315/294 |
| 7,446,428 B2 * | 11/2008 | Sugimura | 307/10.6 |
| 2004/0056157 A1 | 3/2004 | Dufourg | |
| 2004/0255001 A1 * | 12/2004 | Oh et al. | 709/209 |
| 2006/0092895 A1 | 5/2006 | Kim et al. | |

OTHER PUBLICATIONS

Ergen, S.: ZigBee/IEEE 802.15.4 Summary; Sep. 10, 2004, 35 Page Document.

* cited by examiner

| ID | GROUP | BUTTON |
|---|---|---|
| ID(1) | 1 | 4 |
| ID(2) | 1 | 4 |
| ID(3) | 2 | 5 |
| ID(4) | 2 | 5 |

FIG. 4

| ID | GROUP | BUTTON |
|---|---|---|
| ID(1) | 1 | 4 |
| ID(2) | 1 | 4 |
| ID(3) | 2 | 5 |
| ID(4) | 2 | 5 |
| ID(5) | 2 | 5 |

FIG. 5

| ID | GROUP | BUTTON |
|---|---|---|
| ID(1) | 1 | 4 |
| ID(2) | 1 | 4 |
| ID(4) | 2 | 5 |
| ID(5) | 2 | 5 |

FIG. 7

NETWORK COMMUNICATION SYSTEM

FIELD OF THE INVENTION

The present invention relates in general to a communication system having a network structure with two-way communication. In a particular example, the invention may relate to a system for controlling a plurality of light sources, and the invention will be specifically explained with reference to this example, but it is noted that the invention is not limited to this example. Particularly, the network may comprise multiple household appliances of different nature, for instance lighting devices, heating devices, televisions, etc; more generally, any electrically powered appliance, either powered from mains or from a battery.

BACKGROUND OF THE INVENTION

In a particular example, the invention relates to an illumination system comprising a plurality of lamps. Each lamp is provided with a network device capable of switching the corresponding lamp ON or OFF, and possibly capable of dimming the lamp. In the case of an armature with multi-colour lamps, the lamps can be ordered to make a certain desirable mix colour. A user-operated remote control is capable of issuing command signals to the network devices over a communication path that may be wired but preferably is wireless; a preferred way of communication is via RF signals. Thus, the user can remotely operate his illumination system without needing to operate individual switches located with the individual lamps. Further, the system does not require a new infrastructure: an existing lightbulb may simply be replaced by a new lightbulb having the associated network device.

In the following discussion, for sake of convenience, reference will be made to a "lamp" in cases where actually the network device of such lamp is intended, as should be clear to a person skilled in the art.

In order to be able to operate a plurality of lamps individually, it is necessary that the lamps can be distinguished from each other. Therefore, each lamp has a unique ID code or address code, and the command signal issued by the remote control contains an instruction part as well as a part indicating the addressee, i.e. the lamp for which the instruction is intended; the instruction part tells this lamp what it is expected to do.

The command signal may also contain a request for acknowledgement; in that case, apart from receiving and obeying the instruction, the network device also sends an acknowledgement message to the remote control, so that the remote control knows that its command signal has been received by the addressee network device. If such acknowledgement message is not received quickly enough, the remote control will automatically resend the command signal, without the user needing to actuate the corresponding command button again.

The system further comprises a memory containing network definition information. This memory will be indicated as network definition memory. The network definition information comprises, inter alia, a list of ID codes of network devices and a list of ID codes of corresponding remote control devices. It is noted that there may be more network devices in the neighbourhood taking part in the communication and therefore per definition being part of the communication network, but if a network device is not included in the network definition information (i.e. it is not on the list), it can not be addressed and therefore not operated by the remote control.

Further, it is noted that there may be more remote control devices in the neighbourhood, but if a remote control is not included in the network definition information (i.e. it is not on the list), its command signals will not be accepted or obeyed.

Further, the network definition information may comprise a table defining which network device (ID code) is associated with which command button. It is possible that the remote control has command buttons associated with individual lamps. However, it is preferred that one command button is capable of operating a group of lamps simultaneously. In that case, the network definition information may comprise, for each command button, a list of network devices (ID codes) associated with that particular command button, or, alternatively, a list defining which network devices are member of which group as well as a table defining which group is associated with which command button.

The network is not static. It is possible that lamps are added or removed, or that the group assignment of a lamp is changed. Thus, there is functionality allowing the user to amend the network definition memory. The combination of network definition memory and the amendment functionality will be indicated as "coordinating means". In a suitable embodiment, the coordinating means are implemented as a separate device, which will be indicated by the phrase "coordinator". However, the coordination function may also be integrated with other network devices, for instance a remote control. An advantage of a separate coordinator device lies in the fact that the remote control is preferably implemented as a light-weight battery operated device while the coordinator is preferably provided with constant power from mains so that its settings are not lost when the batteries run empty.

A particularly suitable communication protocol for implementing the present invention is Zigbee. Since Zigbee is known per se, as it is an open source standard, a detailed description of Zigbee is omitted here.

SUMMARY OF THE INVENTION

If a lamp is defective, so that the remote control does not receive an acknowledgement signal from this lamp's network device, the remote control will repeatedly try to send its command signal. This takes up communication time of the network, during which time the network can perform no other task. Further, the repeated sending of the command signal as well as the fact that the remote control needs to stay "awake" to listen for en acknowledgement message involve increased consumption of battery power. Further, if the user replaces the defective lamp, it is logical to expect that the user will assign this replacement lamp to the same group as the replaced lamp. For the user, from a practical view, the number of group members remains the same since the defective member is replaced by the new one. However, for the network definition, all that is noticed is that a new network device is added, so that the number of group members increases by one. If the user wishes to avoid this, he has to actively un-register the replaced network device, but, apart from the fact that this involves a user action while the present invention tries to reduce the need for user actions, it may appear to be impossible to actively un-register a network device if the associated appliance is defective. On the other hand, however, there are implementations where a group can only contain a limited number of group member devices, and it is not possible to add a further device if the limit has been reached. Therefore, it is desirable to remove a defective lamp from the network, i.e. to remove its ID code from the network definition memory, so that the remote control will no longer try to send messages to this lamp. This removal is a task for the coordinator. As mentioned before, the coordinator can be brought into a network amendment mode, in which the coordinator removes (or adds) a network device, in response to a user action. The present invention aims at improving user convenience by enabling an automatic removal of defective devices without the need for user action.

As regards functionality, the present invention allows the user to choose whether a particular lamp is connected to mains so that it is actively participating in the network, or whether such lamp is switched OFF hard, i.e. disconnected from mains. In the first case, the lamp can be controlled by the remote control, but in the second case the lamp is always OFF. Consequently, of course, such lamp will not be able to send acknowledgement signals. However, neither the remote control nor the coordinator has means for determining whether a particular lamp is connected or disconnected. Consequently, if a lamp is not responding to a command signal, this may be caused by the lamp being defective or by the lamp being disconnected, and there is no way of distinguishing between these situations. This means that the coordinator is not allowed to simply remove a device automatically on the basis of the mere finding that the device is not responding.

An object of the present invention is to overcome this problem.

According to the present invention, the network definition memory comprises a silence memory having memory locations associated with the individual network devices. Whenever a network device is not responding, the coordinator sets a flag in the corresponding silence memory location, indicating that this device has not sent an acknowledgement signal in response to a command signal at least once, which in turn indicates that this device may be defective. Further, whenever a network device sends an acknowledgement signal in response to a command signal, the corresponding flag in the silence memory is reset, indicating that, the last time a command signal was sent to this lamp, the lamp was not defective. Alternatively, a silence memory location may contain a counter, and instead of setting/resetting a flag, the coordinator may increase the counter value whenever the corresponding network device is not responding and the coordinator may reset the counter whenever the corresponding network device sends an acknowledgement signal in response to a command signal.

According to the present invention, the coordinator is designed to automatically remove a network device from the network definition memory when two conditions are met. A first condition relates to the status of such network device: a network device is only removed if its corresponding flag in the silence memory is set, or, alternatively, if its corresponding counter has a counter value above a predefined threshold.

A second condition relates to timing. In one embodiment, the coordinator is designed to perform the removal operation whenever the user makes the coordinator enter a network amendment mode. In another embodiment, the coordinator is designed to perform the removal operation whenever the user gives a command for adding a network device. In a preferred embodiment, the coordinator is designed to perform the removal operation for a certain network device in response to the user giving a command for adding a network device to the group to which the device-to-be-removed belongs.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which:

FIG. 4 schematically illustrates an example of a network definition table;

FIG. 5 schematically illustrates the network definition table after addition of a new network device;

FIG. 7 schematically illustrates the network definition table after removal of a network device.

DETAILED DESCRIPTION OF THE INVENTION

Figure 1:
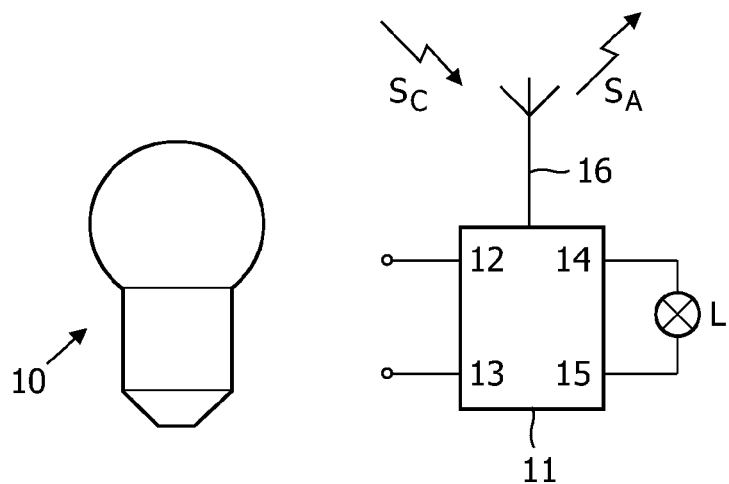
FIG. 1 schematically shows a light bulb with a network device.

By way of example of an appliance in accordance with the present invention, FIG. 1 schematically shows a light bulb 10. The outer appearance of the light bulb is quite common, but internally the light bulb 10 comprises a network device 11 having terminals 12, 13 connected to the lamp contacts for receiving power, and having output terminals 14, 15 connected to the actual light-generating element of the light bulb, e.g. a spiral L. Alternatively, instead of an incandescent light bulb, other types of light sources are possible, for instance a LED or a gas discharge lamp, in which case the output terminals 14, 15 may be connected to a corresponding lamp driver. The network device 11 further has a communication facility, indicated by an antenna 16, via which the network device 11 is capable of receiving a command signal $S_C$ and issuing an acknowledgement signal $S_A$.

Figure 2:
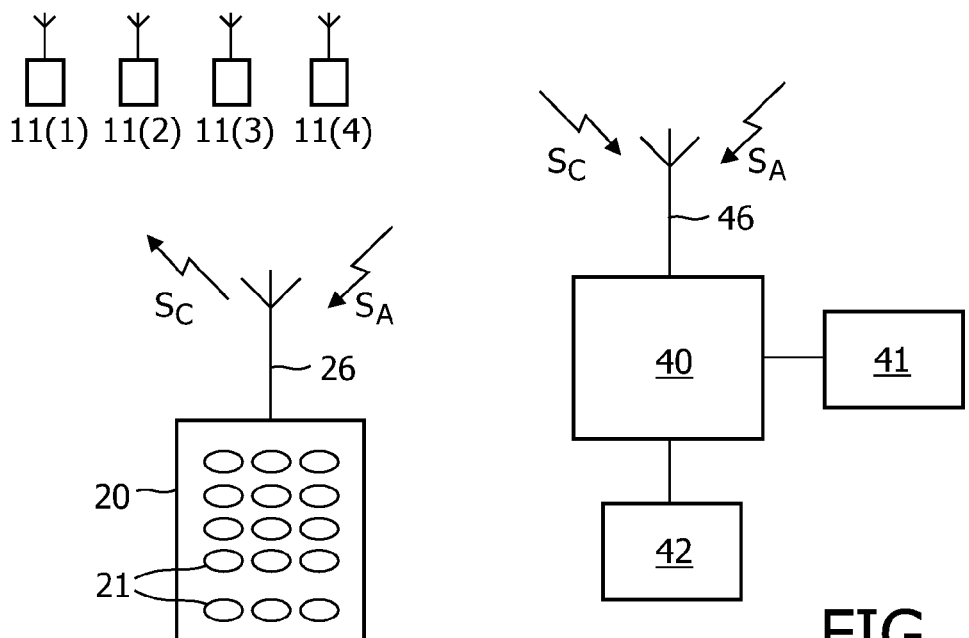
FIG. 2 schematically shows an illumination system.

FIG. 2 schematically shows an illumination system 1, comprising a plurality of light sources 10, each comprising an associated network devices 11. The illumination system 1 is provided with a network communication system 2, comprising the network devices 11 of the light sources 10. In FIG. 2, for sake of simplicity, only four of such light sources 10 with network devices 11 are shown, supplemented by an index for mutual distinction; however, it should be clear that the number of network devices may be less or more than four.

Communication system 2 further comprises a user-operated remote control 20, also having a communication facility, indicated by an antenna 26, via which the remote control 20 is capable of issuing a command signal $S_C$ and receiving an acknowledgement signal $S_A$. The remote control 20 has user input means, typically control keys or buttons, indicated at 21.

Figure 3A:
FIG. 3A schematically illustrates an example of a command signal.

In order to be individually addressable, each network device 11 has a unique ID code, indicated as ID(i). FIG. 3A schematically illustrates that the command signal $S_C$ comprises a data part 31 containing the ID code ID(i) of the network device 11(i) addressed, and a command part 32 containing the actual command, for instance "switch ON" or "switch OFF". Other methods for indicating which network device or group of network devices are addressed are also applicable. Assume that all network devices receive the command signal $S_C$. Each network device 11 is designed, on receipt of a signal, to examine the data part 31 to see whether the code contained in the data part 31 corresponds to its own ID code; if not, such network device may ignore the remainder of the signal. In some implementations, the network devices are designed to act as a repeater (or router) by resending the same command, to increase the range for the remote control 20. If a network device 11 finds that the data part 31 corresponds to its own ID code, it will examine the contents of the command part 32 and act accordingly, while further it will check the operation of the corresponding lamp and, if the lamp operates correctly, it will send an acknowledgement signal $S_A$. This acknowledgement signal $S_A$ may be sent always, or only if so requested in the command signal. Depending on implementation, it is possible that the network device is switched off if the corresponding appliance is defective, in which case such network device can of course never send any acknowledgement signal.

Figure 3B:
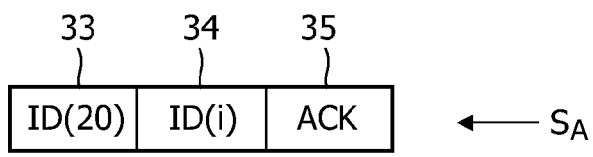
FIG. 3B schematically illustrates an example of an acknowledgement signal.

FIG. 3B schematically illustrates that the acknowledgement signal $S_A$ comprises an addressee data part 33 containing the ID code ID(20) of the remote control 20, a sender data part 34 containing the ID code ID(i) of the sending network device 11(i), and a contents part 35 containing information ACK indicating that the network device 11(i) has received the command signal $S_C$. It is possible that the contents part 35 also contains a repetition of the actual command. By receiving the acknowledgement signal $S_A$ from the sending network device 11(i), the remote control 20 knows that this network device 11(i) has received its command and assumes that this network device 11(i) is acting accordingly. Without the acknowledgement signal $S_A$ being received within a predefined time interval after the sending of the command signal $S_C$, the remote control 20 will resend the command signal $S_C$. The number of resend attempts is limited.

The communication system 2 further comprises a coordinator 40, typically implemented as a suitably programmed microcomputer or the like. The coordinator 40 also has a communication facility, indicated by an antenna 46, via which the coordinator 40 is capable of receiving the command signals $S_C$ and the acknowledgement signals $S_A$. If the coordinator finds that an acknowledgement signal is missing (because it did receive a command signal but did not receive the corresponding acknowledgement signal), this fact may be registered in a log.

The coordinator 40 is provided with a network definition memory 41, comprising, among others, a list of ID codes of network devices belonging to the network, and a relationship between remote control buttons and ID codes. Further, the network devices may be arranged in groups, and the network definition memory 41 also contains the group allocation information. Suitably, the information in the network definition memory 41 is arranged as a table. FIG. 4 gives an example of such table. The figure shows that the network comprises four network devices with ID codes ID(1) to ID(4), that network devices ID(1) and ID(2) belong to group 1 and are associated with button 4, and that network devices ID(3) and ID(4) belong to group 2 and are associated with button 5. It is also possible that there is no separate group information, because the association with a certain button already implies a group allocation. It is also possible that there is a table associating network devices with groups, and that there is a separate table associating groups with buttons.

By operating the suitable button 21, the user can thus remotely operate the lamps 10, either individually or in groups.

Assume that one of the lamps breaks down, for instance lamp 10(3). The user will replace this lamp by taking this lamp out of its socket and placing a new lamp 10(5) into the socket, this new lamp having a network device 11(5) with ID code ID(5). Since this ID code is not known in the network, such replacement lamp will not be controlled by the remote control 20. To solve this, the remote control 20 comprises a button which, when actuated by the user, causes the remote control 20 to issue a network definition signal $S_D$ addressed to the coordinator 40. In response to receiving the network definition signal $S_D$, the coordinator 40 will enter a network amendment mode for, in this case, adding the fifth network device 11(5) to group 2 under button 5. The precise procedure of the adding operation is not relevant here. FIG. 5 shows the result: the table in the network definition memory 41 now comprises five entries.

It is to be noted that the coordinator 40 does not remove the ID(3) of the third network device 11(3). This in itself is correct, because the fifth lamp can actually be a fifth lamp, indeed, enlarging the network, and the coordinator 40 does not know that the third lamp has been removed. It is to be noted that, as a consequence, the network as defined in the network definition memory 41 is larger than the actual size of the network 2, since the memory still contains the ID(3) of the third network device 11(3).

After the addition of the fifth lamp, the coordinator 40 will send the updated network information to the remote control 20. From that moment on, when the user actuates button 5, the remote control 20 will send command signals to three addressees, i.e. with ID codes ID(3), ID(4), ID(5). However, the remote control 20 will never receive an acknowledgement signal from the third network device 11(3), and as a consequence the remote control 20 will repeatedly resend the command signal to this third network device 11(3).

To avoid this, the ID code ID(3) of the third network device 11(3) should be removed from the network definition memory 41, and according to the present invention this is done automatically by the coordinator 40.

According to the present invention, the coordinator 40 is provided with a device status memory 42 comprising, for each network device 11(i), a status memory location M(i) having one of two values, a first value indicating "operating normally" and a second value indicating "potentially defective". During normal use of the network, the coordinator 40 monitors the behaviour of the network devices 11 and stores their status in the device status memory 42, as will be explained below. When entering a network amendment mode, the coordinator 40 will automatically remove a network devices 11 having status "potentially defective", as will be explained below.

Figure 6:
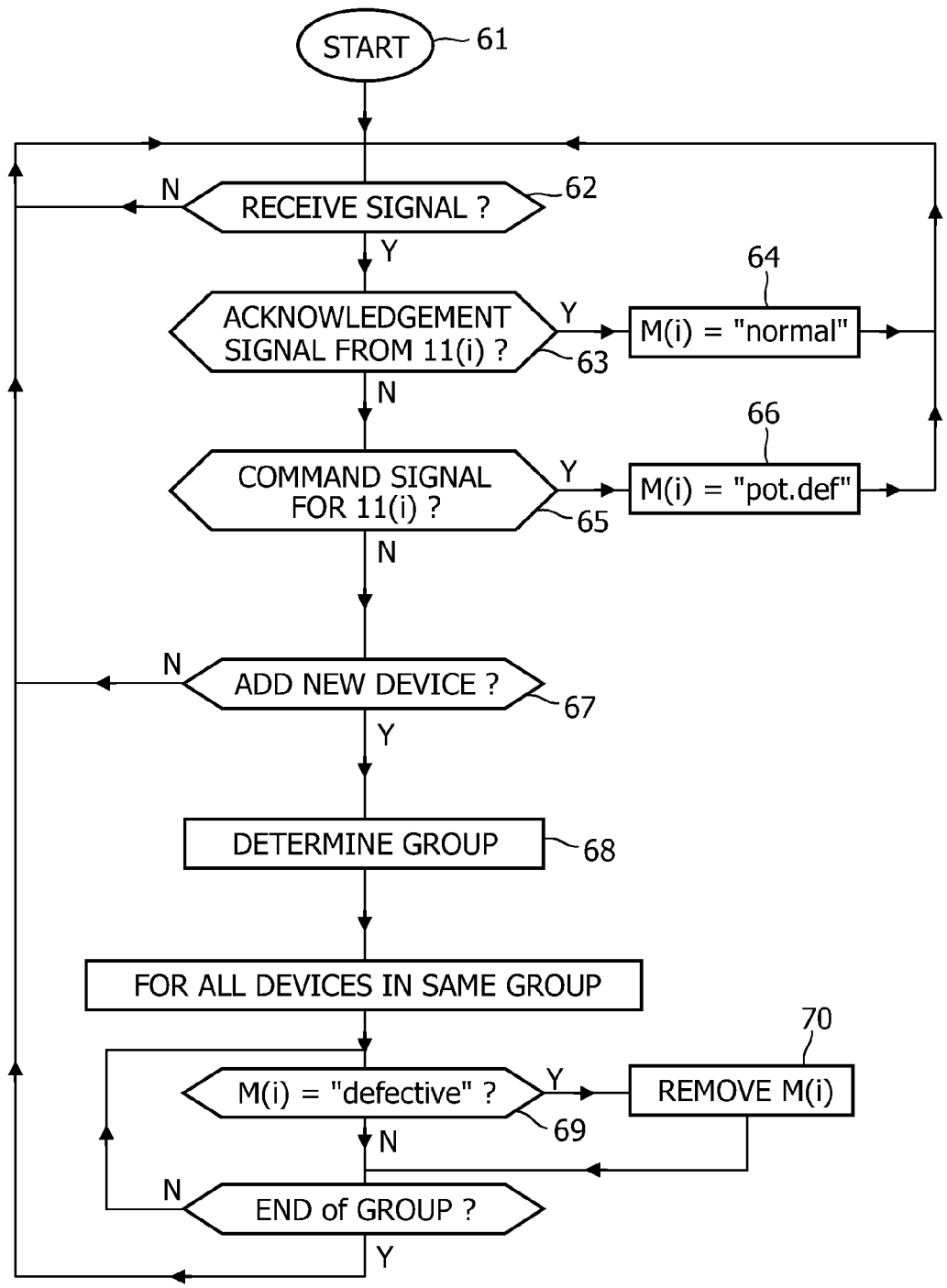
FIG. 6 is a flow diagram schematically illustrating the operation of a coordinator on addition of a network device.

FIG. 6 is a flow diagram schematically illustrating the operation of the coordinator 40. After start [step 61], the coordinator 40 watches for incoming signals being received [step 62].

If the coordinator 40 receives an acknowledgement signal $S_A$ from a network device 11(i) [step 63], the coordinator 40 will store the first value indicating "operating normally" into the corresponding status memory location M(i) [step 64].

If the coordinator 40 notes that a network device 11(i) does not respond to a command signal $S_C$, the coordinator 40 will store the second value indicating "potentially defective" into the corresponding status memory location M(i) [step 66]. To this end, the coordinator 40 may wait for a predetermined time period after receiving the command signal $S_C$, but in a more simple embodiment the coordinator 40 will store the second value already in response to receiving the command signal $S_C$ for the network device 11(i) [step 65].

If the coordinator 40 receives a command for adding a new network device [step 67], the coordinator 40 will determine to which group the new device is added [step 68]. Then, for each network device 11(i) in the same group, the coordinator 40 will consult the device status memory 42 to see whether the corresponding status memory location M(i) indicates "potentially defective" [step 69], and if so, the coordinator 40 automatically removes such network device 11(i) from the network definition memory 41 [step 70].

In the example discussed above, when, in response to a command signal, the third lamp does not go ON and the third network device 11(3) does not send its acknowledgement signal, the coordinator 40 will place the value "potentially defective" into the third status memory location M(3) [step 66]. Then, when later the fifth network device 11(5) is added to group 2, the coordinator 40 will consult the device status memory 42 to see whether the status memory locations M(3) and M(4) indicate "potentially defective" [step 69]. It will find that status memory location M(3) indicates "potentially defective", and thus the coordinator 40 automatically removes the third network device 11(3) from the network definition memory 41 [step 70].

The resulting network definition memory 41 is illustrated in FIG. 7. It can be seen that the group 2 again contains only two members, now the devices 11(4) and 11(5). Further, it should be understood that the remote control 20 will no longer send command signals $S_C$ to the third network device 11(3).

In the above, the invention is explained for an embodiment where the coordinator 40 automatically removes a "potentially defective" network device if the user makes the coordinator 40 enter a network amendment mode for adding a network device. However, it is also possible that the coordinator 40 is designed to automatically remove such "potentially defective" network device if the user makes the coordinator 40 enter any network amendment mode, such as for instance for removing a network device.

In the above, the invention is explained for an embodiment where the coordinator 40 automatically removes a "potentially defective" network device if the user makes the coordinator 40 enter a network amendment mode for adding a network device to the same group as to which the "potentially defective" network device belongs. However, it is also possible that the coordinator 40 is designed to automatically remove such "potentially defective" network device if the user makes the coordinator 40 enter a network amendment mode for adding a network device to any group.

On the other hand, it is possible that the system allows a group to have a certain maximum number of members only. In such case, the coordinator may consider the number of devices corresponding to the same group and only remove a potentially defective device if the maximum has been reached.

In the above, the invention is explained for an embodiment where the status memory locations M(i) can only have two values, indicating "normal" or "potentially defective". However, it is also possible that the status memory locations M(i) are implemented as counters. In that case a value "0" may indicate "normal", and in step 64 the value 0 is written in a memory location M(i) while in step 66 the counter value may be incremented by 1. Then, any value larger than zero will indicate "potentially defective". It is now possible, in order to allow that a lamp is switched OFF hard without this necessarily leading to removal from the network, that in step 69 the value of a memory location M(i) is compared with a predefined threshold, so that a lamp is removed only when the value of a memory location M(i) is above the predefined threshold, indicating that the network device concerned has not responded for at least a certain number of times.

Summarizing, the present invention provides a network communication system 2 for two-way communication, comprising:
at least one group of network devices 11;
at least one command device 20 capable of issuing at least one command signal $S_C$;
coordinating means 40 provided with a network definition memory 41 and with a device status memory 42.

A network device, in response to receiving a command signal $S_C$, sends an acknowledgement signal $S_A$ to the command device.

The coordinating means, in response to receiving a command signal for a network device, watches for the corresponding acknowledgement signal from that network device and, in case of that network device failing to timely send the acknowledgement signal, amends in said device status memory 42 the status information Mi relating to said network device.

The coordinating means automatically removes a potentially defective network device from the network definition memory 41 on entry of a network amendment mode.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, the communication system may be implemented in a system comprising devices different than lamps. Further, it is possible that the coordinator 40 itself comprises buttons for entering a network amendment mode.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Network communication system (2) for two-way communication, comprising:
   at least one group of network devices (11);
   at least one command device (20) capable of issuing at least one command signal (Sc) containing an address code (31) identifying at least one network device (11(i)) and containing an instruction code (32);
   coordinating means (40) provided with a network definition memory (41) containing information relating to the structure and members of the network, and further provided with a device status memory (42) containing information relating to the status of the individual network devices (11) of the network;

wherein the coordinating means are implemented as a separate device or integrated within the command device;

wherein a network device (11 (i)), in response to receiving a command signal (Sc) containing its address code(ID(i)), is designed to perform a predefined function in accordance with the instruction code (32) and, on successful completion of the function, to send an acknowledgement signal (SA) to the command device;

wherein the command device (20), after having sent a command signal (Sc) to a network device (11 (i)), is designed to receive an acknowledgement signal (SA) from that network device (11 (i)) and, in case of not timely receiving the acknowledgement signal (SA), to resend the command signal (Sc) to this network device (11 (i));

wherein the coordinating means (40) is capable of operating in a network amendment mode, which comprises at least a removal mode (70) in which the coordinating means (40) removes a network device from the network definition memory (41) and an addition mode in which the coordinating means (40) adds a network device to the network definition memory (41);

wherein the coordinating means (40) is designed, in response to receiving a command signal (Sc) for a network device (11 (i)), to watch for the corresponding acknowledgement signal (SA) from that network device (11 (i)) and, in case of that network device (11 (i)) failing to timely send the acknowledgement signal (SA), to amend to a potentially defective network device state in said device status memory (42) the status information (M(i)) relating to said network device (11(i));

and wherein the coordinating means (40) is designed to automatically remove the potentially defective network device (11(i)) from the network definition memory (41) on entry of a network amendment mode by a user command.

2. System according to claim 1, wherein the coordinating means (40) is designed, in response to receiving a command signal ($S_C$) for a network device (11(i)), to always amend in said device status memory (42) the status information (M(i)) relating to said network device (11(i)) such that the amended information indicates a potential defect status.

3. System according to claim 1, wherein the coordinating means (40) is designed, in response to receiving the acknowledgement signal ($S_A$) from a network device (11(i)), to write in said device status memory (42) data indicating normal functioning of this network device (11(i)).

4. System according to claim 1, wherein the status information can have two values only, a first value indicating a potential defect status and a second value indicating normal functioning.

5. System according to claim 1, wherein the device status memory (42) comprises at least one counter, and wherein the coordinating means (40) is designed, to increase the value of the counter (M(i)) corresponding to a network device (11(i)) until a limit is reached, for indicating a potential defect status of the network device (11(i)).

6. System according to claim 1, wherein the device status memory (42) comprises at least one counter, and wherein the coordinating means (40) is designed, to reset to zero the value of the counter (M(i)) corresponding to a network device (11(i)) once an acknowledgment is received, for indicating a normal functioning of the network device (11(i)).

7. System according to claim 1, wherein the coordinating means (40) is designed, on entry of any network amendment mode, to automatically consult the device status memory (42) for each of the network devices (11), and to automatically remove from the network definition memory (41) any network devices (11(i)) for which the corresponding device status memory (M(i)) is indicative of a potential defect status.

8. System according to claim 1, wherein the coordinating means (40) is designed, on entry of a network amendment mode for adding a network device, to automatically consult the device status memory (42) for each of the network devices (11), and to automatically remove from the network definition memory (41) any network devices (11(i)) for which the corresponding device status memory (M(i)) is indicative of a potential defect status.

9. System according to claim 1, wherein the coordinating means (40) is designed, on entry of a network amendment mode for adding a network device to a specific group, to automatically consult the device status memory (42) for each of the network devices (11) belonging to that specific group, and to automatically remove from the network definition memory (41) any network devices (11(i)) belonging to that specific group for which the corresponding device status memory (M(i)) is indicative of a potential defect status.

10. System according to claim 1,
wherein each group comprise a predetermined maximum of device members only; and
wherein the coordinating means (40) is designed, on entry of a network amendment mode for adding a network device to a specific group, if the predetermined maximum of device members for that specific group has been reached, to automatically consult the device status memory (42) for each of the network devices (11) belonging to that specific group, and to automatically remove from the network definition memory (41) any network devices (11(i)) belonging to that specific group for which the corresponding device status memory (M(i)) is indicative of a potential defect status.

11. System according to claim 1, wherein the device status memory (42) comprises at least one counter, and wherein the coordinating means (40) is designed, on consulting the device status memory (42) for deciding on the removal of a network device (11(i)), to only remove this device from the network definition memory (41) if the corresponding counter value is above a predetermined threshold.

12. Lighting system (1), comprising at least one lighting appliance (10(i)) and a network communication system (2) according to claim 1, wherein the at least one lighting appliance (10(i)) comprises an associated network device (11(i)), and wherein the network device (11(i)) is capable of controlling the corresponding lighting appliance (10(i)) in response to a command signal from the command device.

* * * * *